United States Patent
katabe

(10) Patent No.: US 6,338,411 B1
(45) Date of Patent: Jan. 15, 2002

(54) SCREW DRUM TYPE FILTRATION DEVICE

(76) Inventor: Toyokazu katabe, 258, Kyomachi 1-chome, Fushimi-ku, Kyoto-shi, Kyoto 612-8083 (JP)

( * ) Notice: Subject to any disclaimer, the term of this patent is extended or adjusted under 35 U.S.C. 154(b) by 0 days.

(21) Appl. No.: 09/601,252
(22) PCT Filed: Nov. 18, 1999
(86) PCT No.: PCT/JP99/06436
§ 371 Date: Jul. 31, 2000
§ 102(e) Date: Jul. 31, 2000
(87) PCT Pub. No.: WO00/32292
PCT Pub. Date: Jun. 8, 2000

(30) Foreign Application Priority Data

Dec. 3, 1998 (JP) .................................................. 342789

(51) Int. Cl.[7] .......................... B01D 29/46; B01D 33/11
(52) U.S. Cl. ...................... 210/383; 210/385; 210/394; 210/403; 210/488
(58) Field of Search ................................ 210/394, 402, 210/403, 404, 383, 385, 488

(56) References Cited

U.S. PATENT DOCUMENTS 4,177,148 A * 12/1979 Hach et al. .................. 210/488
5,118,414 A * 6/1992 Byers .......................... 210/488
5,435,917 A * 7/1995 Seto .............................. 210/403

FOREIGN PATENT DOCUMENTS

| JP | 59-218298 | 12/1984 |
| JP | 60-19012 | 1/1985 |
| JP | 2501173 | 3/1996 |

* cited by examiner

Primary Examiner—Christopher Upton
(74) Attorney, Agent, or Firm—Armstrong, Westerman, Hattori, McLeland & Naughton, LLP

(57) ABSTRACT

An arrangement comprising a filter cylinder (1) composed of an approximately horizontally extending alternately superposed array of fixed plates (8) having circular or approximately circular openings, and annular floating plates (9) having geometrically similar openings (13) slightly larger in diameter than the openings in the fixed plates and also having circular outer peripheries, with small filtration clearances defined, the row of openings in the fixed plates defining a cylindrical space having a fixed inner peripheral contour (3), it being arranged that when the row of openings in the floating plates is positioned outside the cylindrical space, at least two equi-level regions in the lower portion of the outer periphery of the floating plate are exposed beyond the outer edge of the fixed plate, a screw (2) extending through the cylindrical space, and eccentric shafts (12) contact-wise supporting the exposed outer peripheral portions of the floating plates and eccentrically rotated, so as to swing the floating plates.

2 Claims, 5 Drawing Sheets

SCREW DRUM TYPE FILTRATION DEVICE

TECHNICAL FIELD

The present invention relates to a screw drum type filter for filtering sludge containing suspended particles to separate it into filtrate and dehydrated cake.

BACKGROUND ART

As for conventional screw drum type filters, there is, for example, a through-screw type filter cylinder installation system, as disclosed in Japanese Patent No. 1520106. A filter of this system comprises a filter cylinder installed in a substantial range in a drum excluding the opposite ends of the drum for filtering sludge radially from inside to outside of the cylinder, a number of through-holes formed in the peripheral surface of the drum in said substantial range, a screw installed throughout the length of the drum to extend through said filter cylinder, the spaces in said drum at opposite ends thereof being used as an inlet chamber for sludge and an outlet chamber for dehydrated cake. The filtration passage in the filter cylinder is defined by small clearances between alternating annular fixed and movable plates that constitute said cylinder.

In the above arrangement, in order to swing the movable plates, a shaft equipped with a cam key is fitted in circular holes formed in the lower ends of the movable plates and is eccentrically driven while supporting the weight of the plates while a fulcrum bar is loosely fitted in separate circular holes formed in the upper ends of the movable plates to effect vertical and transverse positional control. However, in such arrangement with the cam-key-equipped shaft disposed at a position corresponding to the lower ends of the movable plates, the water forced out from between the plates of the filter cylinder (which water still contains some suspended particles) flows down onto the shaft and then into the bearings at the opposite ends to wear them.

The opening edge shapes of the fixed and movable plates are generally triangular-wavelike serrations, rather than typical round shapes, formed along the circular base lines so as to increase the area of contact with sludge; with such arrangement, however, the suspended particles in the sludge to be processed accumulate in the triangular wavelike troughs of the opening edges, weakening the filtration effect between plates and, in some cases, damaging the vane edges of the screw.

DISCLOSURE OF THE INVENTION

A first object of the present invention is to provide a screw drum type filter wherein a cam or shaft means for direct contact drive of the movable plates of a filter cylinder so as to swing the movable plates is placed at a position sufficiently remote from the middle lower portion of the filter cylinder to prevent the filtrate water forced out from the clearances between the plates from falling down onto said means in large amounts.

A second object of the invention is to provide a screw drum type filter wherein the opening edges of the fixed and movable plates are shaped such that suspended particles hardly accumulate while the area of contact with sludge to be processed is maintained increased to some degree.

To achieve the first object, a screw drum filter according to the invention comprises a) a filter cylinder composed of an approximately horizontally extending alternately superposed array of a number of annular fixed plates having circular or approximately circular openings, and a number of annular floating plates having geometrically similar openings slightly larger in diameter than the openings in said fixed plates and also having circular outer peripheries, with small filtration clearances defined, the row of openings in said fixed plates defining a cylindrical space having a fixed inner peripheral contour, it being arranged that when the row of openings in said floating plates is positioned outside said cylindrical space, at least two equi-level regions in the lower portion of the outer periphery of the floating plate are exposed beyond the outer edge of the fixed plate, b) a screw (2) extending through said cylindrical space for compression-feeding sludge to be processed in a direction with one end of the cylindrical space in said filtration cylinder as the inlet end and the other end as the outlet end, c) at least two eccentric shafts contact-wise supporting said exposed outer peripheral portions of said floating plates and eccentrically rotated, so as to swing the floating plates, and d) a driving mechanism for operatively connecting said screw pitch and said eccentric shafts or for individually driving them.

According to the above arrangement, each floating plate is contacted and supported by the eccentric shafts at the equi-level positions in its peripheral edge sufficiently separated from the middle lower portion thereof; therefore, the water forced out through the filtration clearances between the plates mostly moves along the outer peripheral edges of the movable and fixed plates to reach the lower portions of the plates below the cylindrical shaft, whereupon it flows down, with the result that it hardly collects on the eccentric shafts disposed right and left and the bearings are sufficiently protected against entry of the filtrate water. In addition, the term floating plate is used in almost the same meaning as that of the term movable plate in the conventional filter, and the floating plate is named in consideration of the function of producing a rotation whose speed transmission ratio varies.

Further, to achieve the second object, the screw drum filter according to the invention is such that the opening contours of the fixed and floating plates are defined by rounded wavelike closed curves along the circular base lines.

BEST MODE FOR EMBODYING THE INVENTION

Screw drum filters according to preferred embodiments of the invention will now be described with reference to the drawings.

Figure 1:
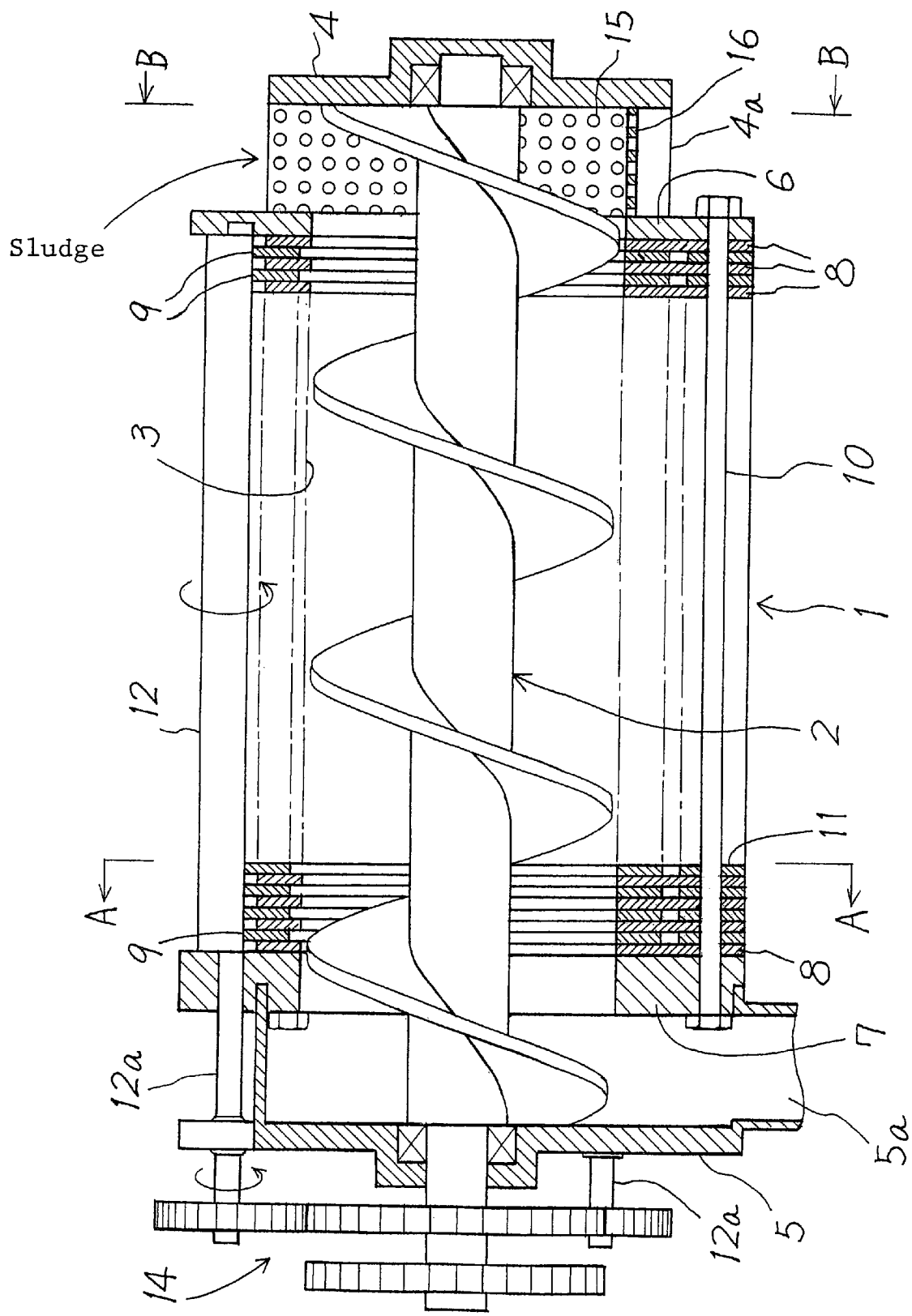
FIG. 1 is a longitudinal section of a basic embodiment.

In FIG. 1, the numeral 1 denotes a filtration cylinder for a screw drum filter; and 2 denotes a screw fitted to and extending through the cylindrical inner peripheral contour 3 of the filtration cylinder 1, the opposite ends thereof reaching an inlet case 4 and an outlet case 5. The filtration cylinder 1 is composed, between a front end plate 6 and a rear end plate 7, of an approximately horizontally extending alternately superposed array of a number of fixed plates 8 having openings, typically circular, and a number of annular floating plates 9 having geometrically similar openings slightly larger in diameter than the openings in said fixed plates 8 and also having circular outer peripheries, wherein the small clearances between such plates provide filtration clearances for sludge to be processed. The cylindrical inner peripheral contour 3 of the filtration cylinder 1 is defined by the row of openings in the fixed plates 8 arranged. In such disposition of the fixed plate 8, a plurality of support bars 10 (in FIG. 1, there appears only one positioned at the lower end) installed between the front and rear end plates 6 and 7 are inserted into the support holes in alternately disposed fixed plates 8 and spacers 11 and are fixed together in close contact with each other, while the floating plates 9 are positioned in spaces defined by the thickness of the spacers 11. These floating plates 9 are supported, position-controlled, rotated (around their own axes) and swung by a plurality of eccentric shafts 12 (in FIG. 1, there appears only one positioned at the upper end) contacting their outer peripheral edges exposed beyond the outer edges of the fixed plates 8.

Figure 2:
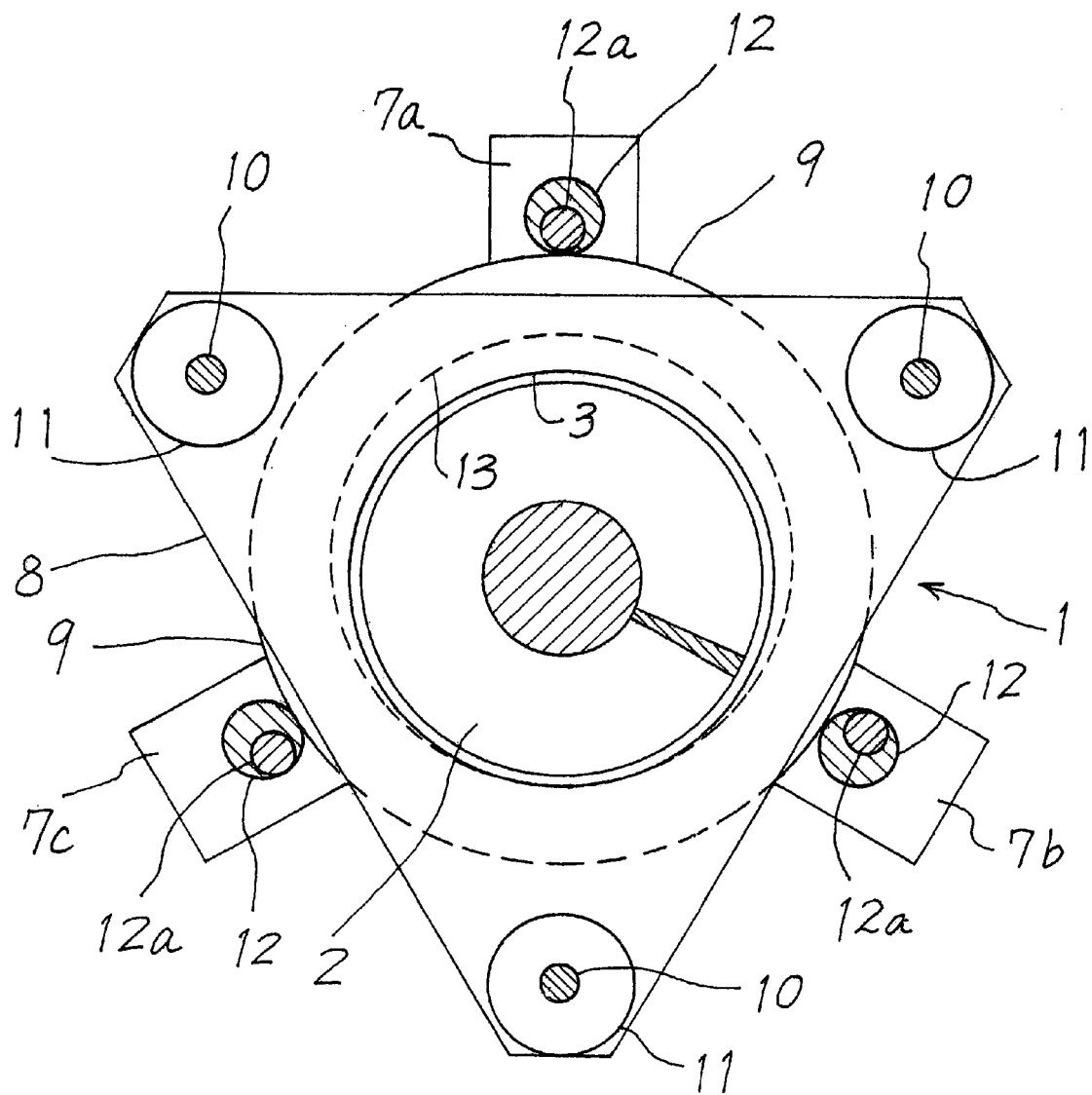
FIG. 2 is a section taken along the line A—A in FIG. 1.

Referring to FIG. 2, which is a section taken along the line A—A in FIG. 1, each fixed plate 8 is an inverted triangular plate having its three apexes cut off, with the support bars 10 and spacers 11 disposed at such apexes. The opening edge of the fixed plate 8 defines said cylindrical inner peripheral contour 3 and in FIG. 2 the floating plate 9 disposed on either side of said plate 8 swings in a plane surrounded by three spaces 11 and within a range in which the opening edge 13 thereof does not enter the cylindrical inner peripheral contour 3. Three eccentric shafts 12 are rotatably installed between intermediate extensions 7a, 7b, 7c on the individual sides of the rear end plate 7, which has a basic shape congruent to the shape of the fixed plate 8, and intermediate extensions 6a, 6b, 6c (FIG. 4) of the front end plate 6 corresponding thereto, and are driven in operative connection to the screw 2 by a gear train 14 (FIG. 1) disposed outside the outlet case 5. In addition, the eccentric shafts 12 may be driven separately from or independently of the screw 2 by some other driving mechanism.

The circular outer peripheral edge of the floating plate 9 projects beyond the middle portions of the three longer sides of the fixed plate 8 within said range of swing movement and is contacted and supported by the three eccentric shafts 12, all of the floating plates 9 being rotatively swung by the eccentric rotation of these eccentric shafts 12. Each eccentric shaft 12 is of integrated construction having small-diametered eccentric shafts 12a projecting from the opposite ends of the main body shaft; therefore, when the outer periphery of the main body shaft effects rotary movement, the floating plate 9 is frictionally driven thereby and also produces rotary motion. However, the opposite surfaces of the floating plate 9 rubs against the fixed plates 8 with small filtration clearances defined therebetween, and since this produces a frictional resistance, it is thought that in the relation between this frictional resistance and the frictional resistance for the outer periphery versus the eccentric shaft 12, a slight amount of rotation of the floating plate 9 is produced. In order to reduce the frictional resistance for the outer periphery of the floating plate 9 versus the eccentric shaft 12, it is possible to construct the eccentric shaft 12 as a so-called eccentric cam or the like so that the peripheral surface may perform eccentric vibration alone without producing rotary movement. However, if there is no problem in requiring additional energy to rotate the floating plate also, it is obvious that positive production and utilization of this rotation lead to preferred re-formation of the filtration clearances and to a further increase in the filterability.

In addition, the floating plate 9 may be such that it is supported by the eccentric shafts only at its portions exposed beyond the adjacent longer sides of the fixed plate 8. This means that the floating plate 9 suffices for the purpose so long as it is constructed such that at least two equi-level regions in the lower portions of the floating plate 9 are exposed beyond the outer edge of the fixed plate 8.

Figure 3:
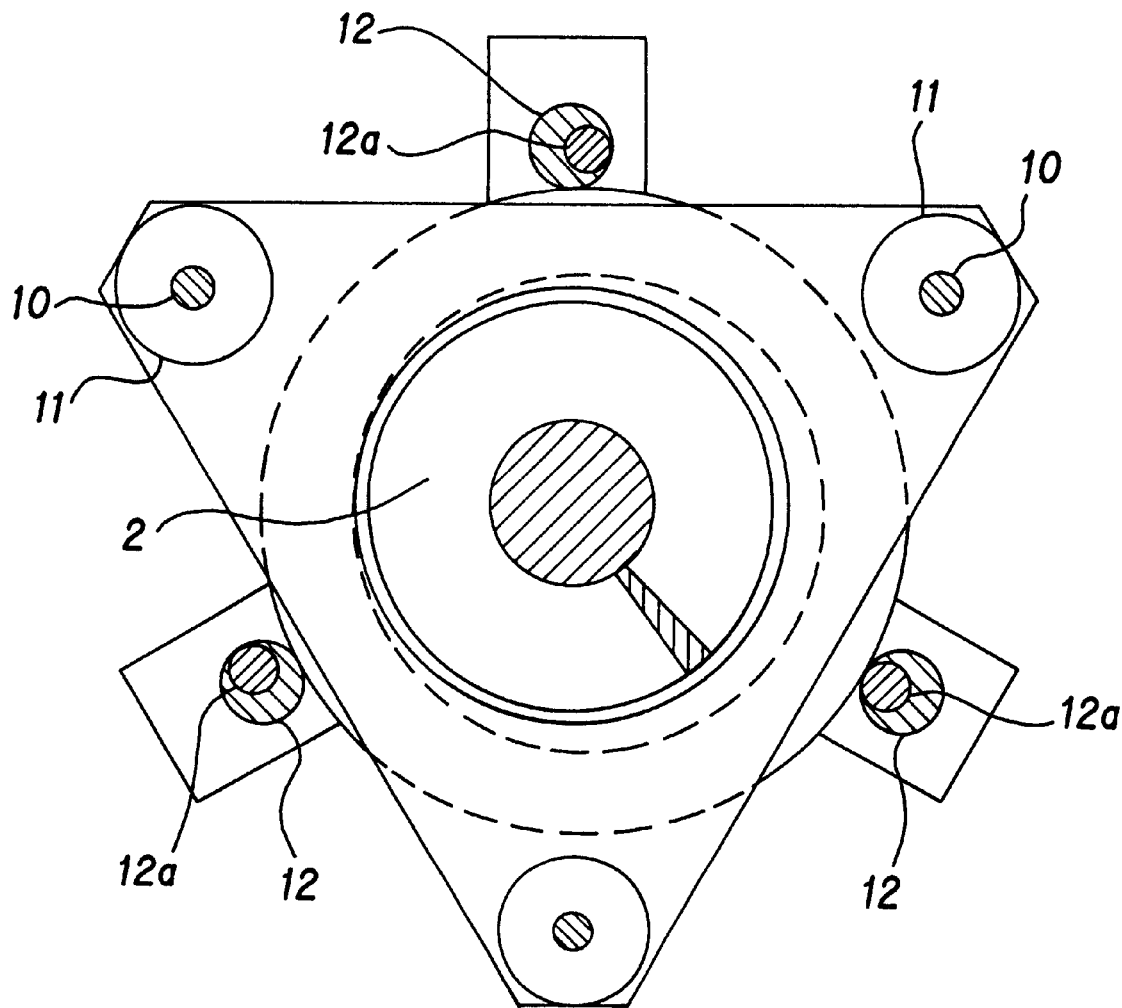
FIG. 3 is a section similar to FIG. 2, showing a screw and movable plates rotated from the state of FIG. 2.

FIG. 3 shows the screw 2 rotated clockwise through 25° from the state shown in FIG. 2 and the eccentric shafts 12 rotated concurrently therewith counterclockwise through about 45°. In FIG. 2, the opening edge 13 of the floating plate 9 and the uppermost portion of the opening edge of the fixed plate 8 are separated farthest from each other and the lowermost portions of opening edges of the two plates approximately coincide with each other, whereas in the state of FIG. 3 the opening edge 13 of the floating plate and the portion of the opening edge of the fixed plate opposed to the eccentric shaft 12 positioned at 30° lower right are separated farthest and their portions opposed to the support bar 10; positioned at 30° upper left approximately coincide with each other. It will be understood that the floating plate 9 swings in this manner in operative connection with the rotation of the screw 2.

Figure 4:
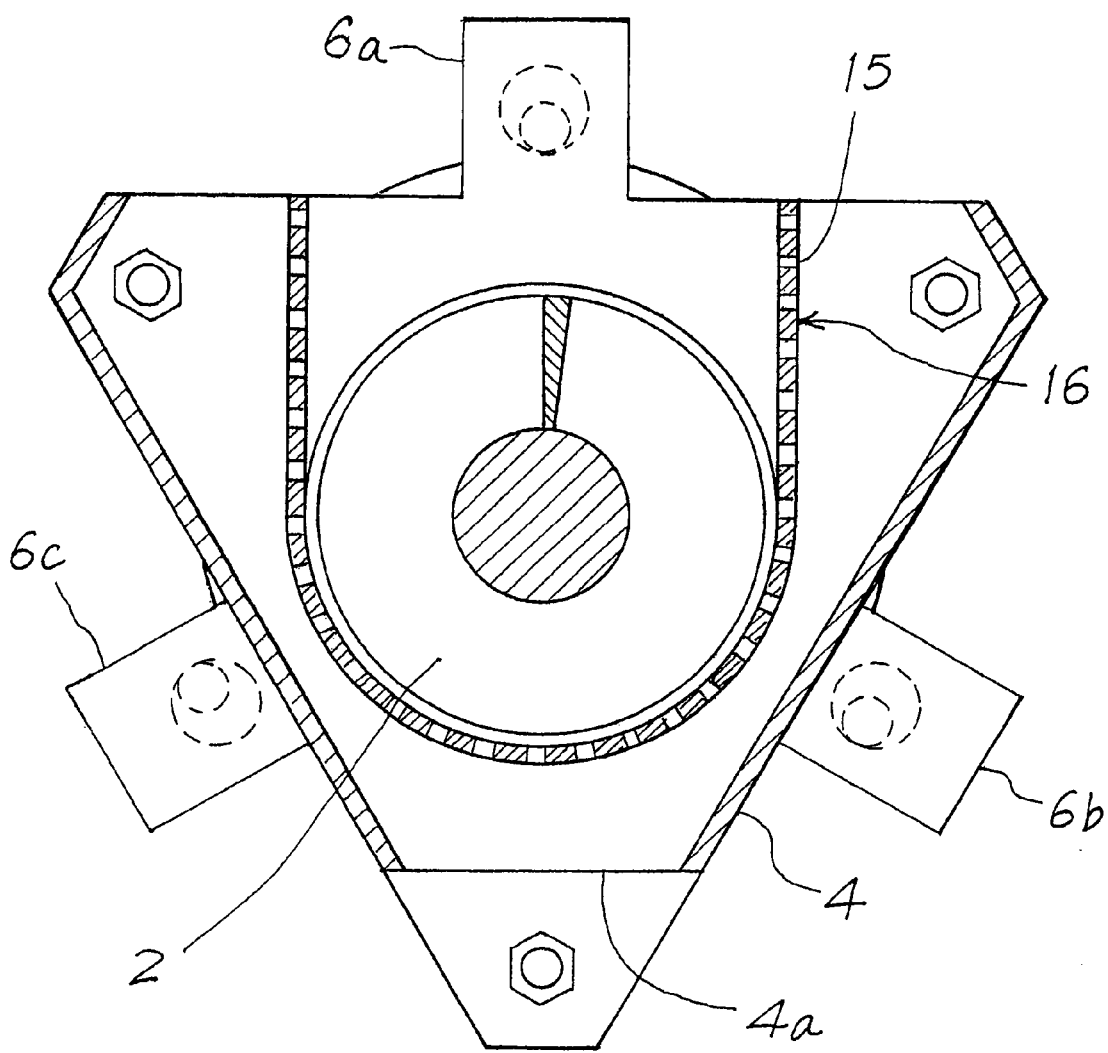
FIG. 4 is a section taken along the line B—B in FIG. 1, showing an inlet in the basic embodiment.

FIG. 4 is a section taken along the line B—B in FIG. 1, showing construction of the inside of the inlet case 4. An U-type curved plate 16 having a number of small holes 15 and also having a curved surface slidably contacting the outer edges of the vanes of the screw 2 is installed in the case 4 to extend between the front and rear walls of the case (see FIG. 1), so as to receive sludge to be processed from the open upper end.

In the construction of the basic embodiment described above, when the screw 2 is driven, the eccentric shafts 12 are rotated simultaneously therewith through the gear train 14, so that the floating plates 9 swing, as described above. The sludge to be processed that is introduced into the U-type curved plate 16 in the case 4 is propelled and fed into the filtration cylinder 1 by the screw 2, said sludge being compressed by the compression effect of the screw to have part of its water component forced out through the small holes 15 in the U-type curved plate 16, said water component being discharged through the lower end opening 4a in the inlet case 4. In addition, in the case where such U-type curved plate is not used, the lower end of the inlet case 4 may be formed in a bag type having no opening 4a, in which case the introduced sludge to be processed will be fed as it is to the filtration cylinder 1. The sludge to be processed that is gradually compressed in the filtration cylinder 1 by the screw 2 is radially filtered through the filtration clearances permanently (slidingly) regenerated between the floating plates 9 and the fixed plates 8 by the aforesaid swing of the floating plates 9, and the filtrate water component moves along the peripheral edges of these plates 8 and 9, the greater part of which water component reaches the lower ends of the fixed plates 8 positioned between two lower eccentric shafts 12 and then flows down therefrom, without flowing into the bearings for the eccentric shafts 12, so that it does not cause corrosion or wear of the bearings. The thus compressed and concentrated cake from the sludge is discharged through the outlet port 5a at the lower end of the outlet case 5.

Figure 5:
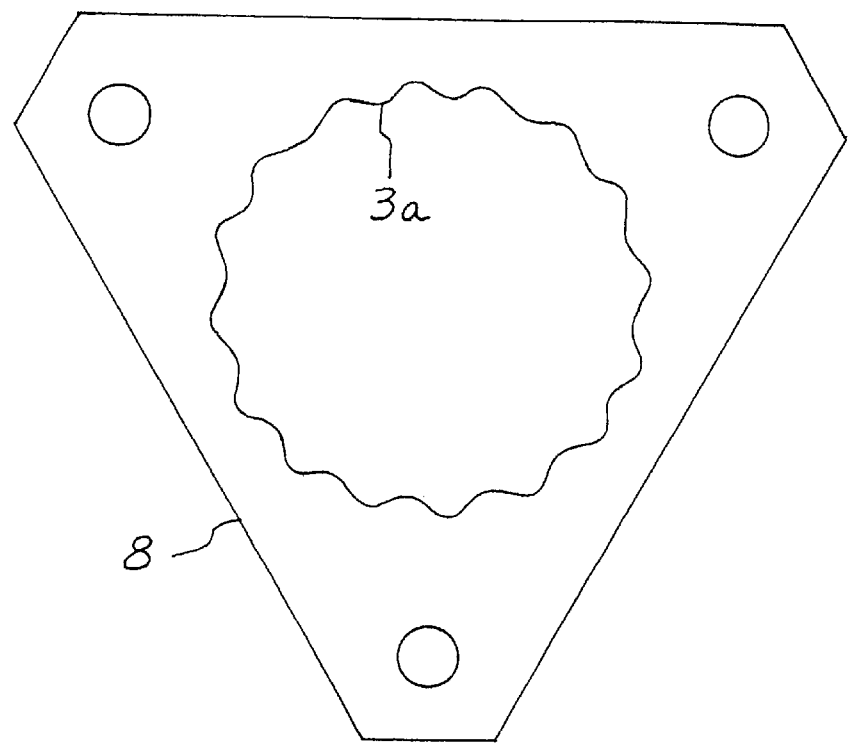
FIG. 5 is a plan view showing an example of preferred shape for the fixed plates.
Figure 6:
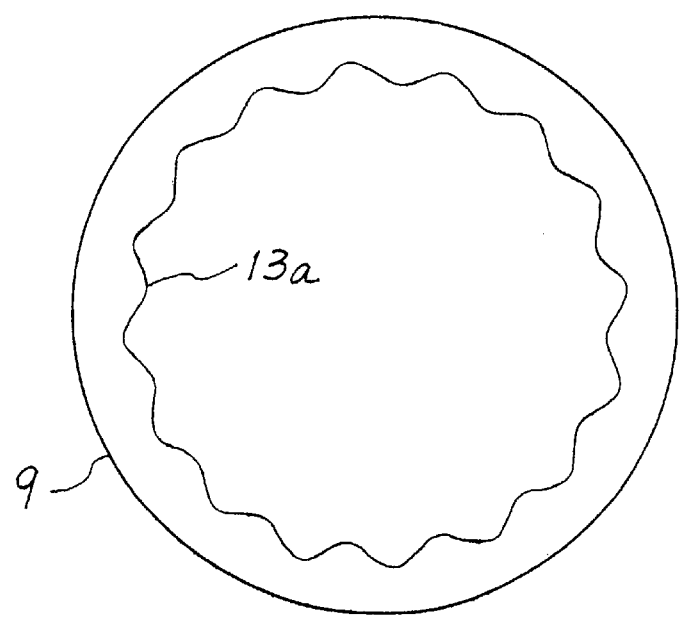
FIG. 6 is a plan view showing an example of preferred shape for the movable plates.

FIGS. 5 and 6 are views showing preferred opening shapes for the fixed and floating plates 8 and 9, respectively, and the contours of their opening edges 3a and 13a are defined by rounded wavelike closed curves along the circular base lines. Of course, the opening edge 13a of the floating plate is somewhat larger than the opening edge 3a of the fixed plate so that the former does not enter the latter during operation. According to such opening shapes, the opening edges 3a and 13a maintain the area of contact with the sludge to be processed somewhat larger than in the case of a simple circle, thereby increasing the filtration efficiency. Moreover, since the opening edges are not pointed as in the case of triangular waves, there is obtained an effect that suspended particles hardly accumulate.

INDUSTRIAL APPLICABILITY

As has been described so far, the present invention provides a screw drum device including a means (eccentric shafts 12) for direct contact with the floating plates and having a simple construction adapted to prevent the filtrate water from entering the bearings for said means. Further, the openings in the fixed and floating plate may be in the shape of rounded waves so as to provide a long-life screw drum device having a high degree of filtration efficiency.

What is claimed is:

1. A screw drum type filter comprising;
    (a) a filter cylinder composed of an approximately horizontally extending alternately superposed array of a number of annular fixed plates having circular or approximately circular openings, and a number of annular floating plates having geometrically similar openings slightly larger in diameter than the openings in said fixed plates and also having circular outer peripheries, with small filtration clearances defined between the plates, the row of openings in said fixed plates defining a cylindrical space having a fixed inner peripheral contour, it being arranged that when the row of openings in said floating plates is positioned outside said cylindrical space, at least two equi-level regions in the lower outer peripheral portion of the floating plate are exposed beyond the outer edges of the fixed plate,
    b) a screw extending through said cylindrical space for compression-feeding sludge to be processed in a direction with one end of the cylindrical space in said filtration cylinder as the inlet end and the other end as the outlet end,
    c) at least two eccentric shafts for contacting and supporting said exposed outer peripheral portions of said floating plates and eccentrically rotated, so as to drive the floating plates in swing and rotation mode, and
    d) a driving mechanism for operatively connecting said screw pitch and said eccentric shafts or for individually driving them.

2. A filer as set forth in claim 1, characterized in that the opening contours of said fixed and floating plates are defined by rounded wavelike closed curves along the circular base lines.

* * * * *